United States Patent [19]

Gallagher et al.

[11] 4,374,211

[45] Feb. 15, 1983

[54] ARAMID CONTAINING FRICTION MATERIALS

[75] Inventors: John P. Gallagher, Bayville, N.J.; Philip H. Dougherty, Penndel, Pa.

[73] Assignee: Thiokol Corporation, Newtown, Pa.

[21] Appl. No.: 302,330

[22] Filed: Sep. 15, 1981

[51] Int. Cl.$^3$ .......................................... C08L 61/06
[52] U.S. Cl. ................................. 523/156; 523/153; 523/155; 523/157; 524/439; 524/440; 524/35
[58] Field of Search ...................... 523/153, 155, 156; 524/157

[56] References Cited

U.S. PATENT DOCUMENTS

| | | | |
|---|---|---|---|
| 3,856,120 | 12/1974 | Kwolek et al. | 260/38 |
| 4,125,496 | 11/1978 | McGinnis | 260/42.17 |
| 4,130,537 | 12/1978 | Bohrer | 260/38 |
| 4,137,214 | 1/1979 | Sochalski | 260/38 |
| 4,219,452 | 8/1980 | Littlefield | 260/42.22 |

FOREIGN PATENT DOCUMENTS 2000517  1/1979  United Kingdom ................ 523/156

OTHER PUBLICATIONS

"DuPont Develops Pulp Form of 'KEVLAR' for Asbestos Replacement Applications", dated Feb. 23-26, 1981.

Modern Plastics, "Fibrous Reinforcements: Alive with Product-Improvement Technology", Jul. 1981, pp. 44-47.

*Primary Examiner*—Lewis T. Jacobs
*Attorney, Agent, or Firm*—Gerald K. White

[57] ABSTRACT

The addition of aramid polymer pulp fiber to non-asbestos type friction material compositions results in a marked improvement in the flexural strength and structural integrity of preforms used in the manufacture of friction elements. The consequent handling characteristics of the preform lead to significant improvements in ease of manufacturing of the friction element.

40 Claims, 1 Drawing Figure

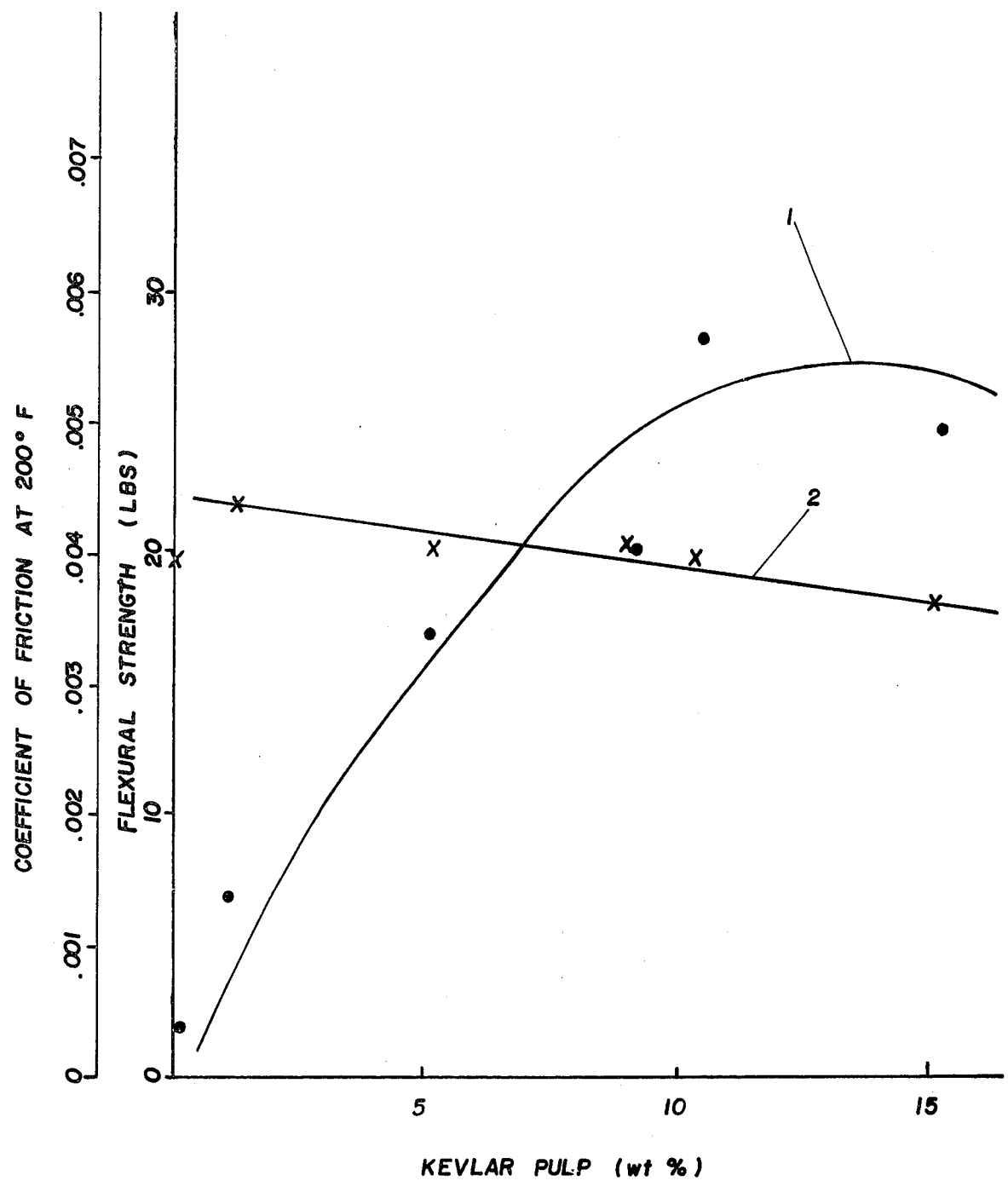

ARAMID CONTAINING FRICTION MATERIALS

BACKGROUND OF THE INVENTION

This invention relates to the incorporation of an aramid polymer pulp fiber into non-asbestos type friction materials for the purpose of improving the structural integrity of preforms. The preforms serve as an intermediate product in the manufacture of friction elements.

It has become desirable to find a replacement for asbestos containing friction materials because of health and safety hazards to people coming in contact with such materials. Numerous approaches to the replacement of asbestos have led to a substantial body of art that has resulted in at least three major categories of non-asbestos type formulations. They are: (1) semi-metallic materials, (2) organic non-asbestos materials, and (3) cold molding hydrocarbon materials. Such categories are generally illustrated by U.S. Pat. Nos. 3,856,120; 4,137,214; and 4,125,496, respectively. Other typical non-asbestos formulations are included in U.S. Pat. Nos. 4,278,584; 4,226,758; 4,226,759; and 4,219,452. The later patent teaches the addition of aramid polymer fibers such as KEVLAR 29 as a substitute for asbestos. The aramid polymer fiber functions as a reinforcing agent.

The elimination of asbestos from friction material formulations has created a substantial manufacturing problem. The problem is that the non-asbestos containing preforms, normally pressure formed at ambient temperatures prior to hot pressing and heat curing, do not possess acceptable structural integrity so as to be able to withstand subsequent handling and storage without breakage. On the other hand, asbestos-containing compositions possess the requisite structural integrity to withstand such handling. This invention solves the structural integrity problem encountered in non-asbestos preforms with the expedient of incorporating an effective amount of a pulp fiber form of an aramid polymer into the friction material to ensure the attainment of sufficient structural integrity to withstand the subsequent handling and/or storage of the compact prior to further processing.

It has been suggested that KEVLAR fibers, in pulp form, can be added to friction products as a replacement for asbestos. The pulp is said to enhance reinforcing characteristics. However, advantages associated with the incorporation of such pulps into friction material systems that have been especially formulated to avoid the problems associated with asbestos do not appear to have been appreciated.

SUMMARY OF THE INVENTION

The invention generally pertains to a non-asbestos type friction material composition, such as semi-metallic, organic non-asbestos, or hydrocarbon cold forming types. The inventive composition is suitable for use as a friction element, and is comprised of a thermosetting binder, a fibrous reinforcing material, and an effective amount of a aramid polymer pulp fiber to result in good structural integrity of preforms made from the friction material. It has been discovered that up to 15% by weight based upon the total weight of all other ingredients of the pulp fiber may be preferably used. Upon forming a mixture of the friction material composition of the invention, a friction element may be manufactured by following the steps of compressing the mixture to form a preform, pressing the preform at elevated temperatures, treating said pressed material at a temperature sufficient to effect curing, and then forming a friction element such as disc brakes, friction pads, clutch linings, and the like from the cured material by conventional steps.

BRIEF DESCRIPTION OF THE DRAWING

The sole FIGURE illustrates the effect of KEVLAR pulp upon flexural strength and coefficient of friction at 200° F.

DETAILED DESCRIPTION OF THE INVENTION

It has been discovered that the so-called "green strength" of non-asbestos type friction material preforms can be substantially improved by the incorporation of relatively small amounts of aramid polymer pulp fibers into the friction material. Aramid pulp fibers may be typically included in amounts ranging from an effective amount to result in good structural integrity of the preform to about 15% by weight based on the total weight of all other ingredients. No particular advantage is seen to exceeding the 15% level due to economic considerations, and, hence, such upper level is contemplated. It is preferred to utilize from about 0.5% to 10% so as such amounts are adequate for insuring the attainment of good structural integrity of the preform and serve to optimize a flexural strength.

Aramid polymers suitable for use in practice of the invention are commercially available from E. I. DuPont de Nemours Company, Wilmington, Delaware under the trade names KEVLAR, KEVLAR 29, KEVLAR 49, and NOMEX. The term "aramid polymer" as used in the present specification means a synthetic polymeric resin generally designated in the art as an aromatic polycarbonamide. "Aramid polymer" is disclosed in Technical Disclosure T950,008 (95 OG 6, published Sept. 7, 1976, and based on an application originally filed Feb. 18, 1975) as being a polymer described in U.S. Pat. Nos. 3,652,510; 3,699,085; and 3,673,143 and is believed to be of a composition hereinafter described. In these patents, the polymers disclosed therein include fiber forming polymers of high molecular weight, e.g. having an inherent viscosity of at least about 0.7, characterized by recurring units of the formula $$\left[ -N(H)-Ar_1-N(H)-\overset{O}{\underset{\|}{C}}-Ar_2-\overset{O}{\underset{\|}{C}}- \right]-$$

wherein $Ar_1$ is p-phenylene and/or chloro-substituted p-phenylene and/or 4,4-substituted diphenyl methane, i.e.,

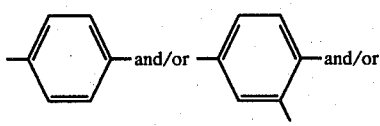

and $Ar_2$ is p-phenylene, i.e.,

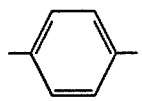

Illustrative examples of polycarbonamides coming within the definition of the above formula are poly (p-phenylene terephthalamide), chloro-substituted poly (p-phenylene terephalamide), and copolymers thereof.

The designation of the position of location of the substituent groups on the aromatic nuclei of the aramid polymer refers to the location of the substituents on the aromatic diamine, diacid or other coreactants from which the aramid polymer is prepared.

Although the aramid polymer or aromatic polycarbonamide may consist primarily of carbonamide links (—CONH—) and aromatic ring nuclei, conforming to the formula above, the polymer may contain up to 20 mole percent and preferably 0 to 5 mole percent of non-conforming comonomer units which provide units in the polycarbonamide chain different from

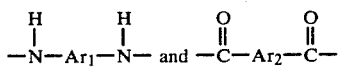

such as aromatic carbonamide units whose chain extending bonds are coaxial or parallel and oppositely directed, e.g.

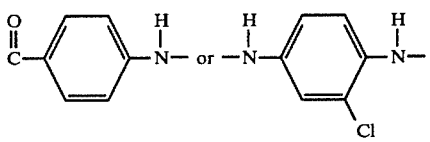

meta-phenylene units, non-aromatic and non-amide groups.

A more comprehensive disclosure of the composition of armid polymers is found in U.S. Pat. No. 3,673,143 as well as the divisional patent thereof, U.S. Pat. No. 3,817,941, the teachings of which are herein incorporated by reference.

Independent analytical tests and infra-red analysis have indicated that KEVLAR 29 could be predominately (95% weight) poly (p-phenylene diamine terephtalamide) and could be chemically described as poly (p-phenylene diamine terephthalamide)-co-poly (4,4-diamino diphenyl methane terephthalamide).

It is important that the aramid polymers utilized to obtain the unique advantages of the invention are in the pulp form of aramid fibers. Pure pulp fibers are very short, highly fibrillated with many, very fine fibrils or subfibers attached to a core fiber. The length of the pulp is from about 2 to 4 mm. The pulp is further discussed in a brochure entitled "DuPont Develops Pulp Form of "KEVLAR" for Asbestos Replacement Applications," by E. I. DuPont de Nemours Company, Wilmington, Delaware.

Three general types of non-asbestos type friction materials have evolved in the art. They are semi-metallic materials, organic non-asbestos materials, and hydrocarbon cold forming materials.

Semi-metallic systems typically include phenolic resins; carbonaceous particles such as graphite or carbon particles; non-asbestos fibers such as those of steel, ceramic, or carbon; ceramic powders such as those of magnesium oxide, zircon, mullite and alumina; metal powders such as those or iron, copper, brass, and stainless steel; and other modifiers such as elastomers and inorganic wear fillers.

Semi-metallic systems typically may contain the following amounts of the above constituents:

| Ingredient | Wt. % |
| --- | --- |
| Phenolic Resin | 4–13 |
| Graphite or Carbon Particles | 15–40 |
| Fibers[1] | 0–25 |
| Ceramic Powders[2] | 2–10 |
| Metal Powders[3] | 15–40 |
| Other Modifiers[4] | 0–20 |

[1] steel, ceramic, or carbon fibers
[2] magnesium oxide, zircon, mullite, alumina
[3] iron, copper, brass, stainless steel
[4] elastomers, inorganic wear fillers.

In the manufacture of friction elements, the semi-metallic friction material constituents are mixed together to form a homogeneous mixture. The mixture is then pressed into preforms. The preforms are then transferred to a second press where pressure and heat are simultaneously applied, causing the resin to melt and flow throughout the piece forming a continuous matrix for holding the other ingredients. The lining pads are then transferred to curing ovens and cured at temperatures ranging from 300° to 600° F. to further set the resins.

Organic non-asbestos systems typically include a thermosetting resin; cashew particles; non-asbestos fibers; and more than 20% by weight of a powdered inorganic compound having a Moh's hardness rating of greater than 2 and less than 5 and capable of being subjected to temperatures of greater than about 425° C. without substantial chemical or physical alteration. Such components are described in greater detail in U.S. Pat. No. 4,137,214 which patent is hereby incorporated by reference herein for the purpose of such additional description. Organic non-asbestos systems typically may contain the following amounts of the above ingredients:

| Ingredient | Wt. % |
| --- | --- |
| Thermosetting Resin | 10–30 |
| Cashew Nut Particles | 5–25 |
| Non-Asbestos Fibers | 5–15 |
| Inorganic Compound | 20–60 |

Another so-called organic non-asbestos friction material is disclosed in U.S. Pat. No. 4,278,584. This patent discloses the following general formulation:

| Ingredient | Weight % |
| --- | --- |
| Phenol-formaldehyde Resin | 6–12 |
| Carbon Fibers | 10–40 |
| Steel Fibers | 30–60 |
| Inorganic and/or Organic Fillers | 10–20 |

Friction elements may be typically manufactured from organic non-asbestos mixtures by placing a quantity of the mixture in a mold and pressing at 1200 psi with a 10 second dwell time in the mold to form a preform and then curing the preform at 300° F. for 15 minutes at 4000 psi with degassing at the end of one and 2.5 minutes. The edges of the cured preform are then trimmed to remove excess material and the preform post-baked while under constraint in a forming container to prevent swelling for a period of 8 hours. The temperature is increased linearly over a period of 1.5 hours to 400° F. and then held at that point for the remaining period.

Hydrocarbon cold forming friction materials of the non-asbestos type may typically include at least two systems. The first system includes non-asbestos inorganic fibers, cellulose fibers, optionally carbon and/or graphite particles, and a thermosetting organic binder comprising a hydroxyl terminated butadiene copolymer of the formula

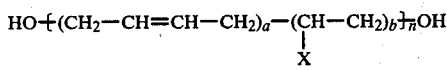

wherein X is phenyl or CN, a has a value of from 0.05 to 0.95, b has a value of from 0.005 to 0.5, and n is an integer from about 10 to 140; the binder having been cured with from about 0.1 to about 5 percent of a peroxide catalyst.

A second non-asbestos hydrocarbon cold forming system includes metallic materials, graphite particles bonded together when a thermosetting hydroxyl butadiene copolymer of the formula:

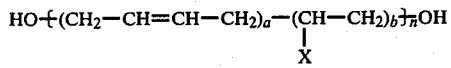

wherein X is phenyl or CN, a has a value of from 0.5 to 0.95, b has a value of from 0.005 to 0.5, and n is an integer from about 10 to about 140; the copolymer having been cured with from about 0.02 to about 12.5 percent of a peroxide catalyst.

The components mentioned above for both systems are discussed in greater detail in U.S. Pat. No. 4,125,496 which patent is hereby incorporated by reference for the purpose of such additional description.

The abovementioned systems typically may contain the following amounts of the above constituents:

| First System Ingredient | Wt. % |
| --- | --- |
| Inorganic Fibers | 20–70 |
| Cellulose Fibers | 5–25 |
| Coke Particles | 0–15 |
| Graphite Particles | 0–10 |
| Carbon Black | 0–15 |
| Thermosetting Organic Binder | 10–60 |

| Second System Ingredient | Wt. % |
| --- | --- |
| Metallic Material[1] | 15–75 |
| Graphite Particles | 5–20 |
| Thermosetting Organic Binder | 2–50 |

[1] Metal fibers, metal powder or admixtures

In the manufacture of friction elements, hydrocarbon cold molding formulations are typically uniformly mixed and then cold molded at pressures on the order of 2000 to 5000 psi to form a preform.

Curing of the preform can be accomplished by heating at elevated temperatures on the order of about 350° to about 600° F. for a period of several hours.

In order to demonstrate the working of the invention, the friction compositions disclosed in Tables I and II were formulated. As will be noted, Example 1-3 pertains to a typical semi-metallic friction composition and Examples 4-14 pertain to a typical organic non-asbestos friction composition. KEVLAR pulp and/or fiber was added to such formulations with the amount of KEVLAR material being expressed as a weight percentage of the formualtion base. Following formulation, the 200 gram samples were formed into preforms at a pressure of 1500 psi at ambient temperature. The samples were evaluated for flexural strength following storage for 24 hours at a temperature of 68° F. and 50% relative humidity.

A Model TTD Instron tensile testing machine was used to perform flexural strength testing. A 5⅜" long and 1½" wide test specimen was placed over two 1" diameter rods and the tensile testing machine crosshead lowered onto the specimen until the specimen fractured. Flexural strength results are indicated in Table III. In addition, treated preform Examples 4-14 were evaluated for coefficient of friction and wear properties. The preforms were hot molded for 15 minutes at 300° F. and post-baked for 8 hours at 400° F. while constrained. A typical commercially available friction testing machine having the ability to measure drum temperature, to heat and cool the drum, to control drum heating and cooling rate, to measure friction force, and to measure drum rotational speed was utilized to obtain the coefficient of friction and wear data. The test specimens were taken from the center of the treated preform approximately equidistant from each end. The specimens were 2.514 mm, flat on the bottom, and the radius of the working surface conformed to the radius of the test drum (279.4 mm). Specimen thicknesses were about 6.10 mm. The speciments were tested for wear (weight loss and thickness loss) at 417 rpm, 100 psi; and at a maximum temperature of 200° F. and 350° F. for a minimum of 20 minutes to obtain at least 95% contact. During the wear testing, coefficient of friction measurements were taken at the end of the application.

In view of the results obtained, it is apparent that the addition of KEVLAR pulp to friction materials serves to enhance the green strength of the preform up to a level of about 10 wt %. The strength advantage declines somewhat at levels about 10 wt % but is still manifested at about 15 wt %. The effect of KEVLAR pulp upon flexural strength and coefficient of friction at 200° F. is graphically illustrated on the sole FIGURE at curve 1. Hence, it is seen that KEVLAR pulp additions are effective to improve the structural integrity of the preform and that amounts up to on the order of about 15% are quite effective. A range of about 0.5 to 10 wt % is preferred; the lower amount to ensure that adequate green strength improvement is obtained and the upper level to optimize the strengthening effect.

The test data also indicate that KEVLAR fiber serves to increase flexural strength to a greater extent than KEVLAR pulp. Examples 6 and 11 demonstrate such function. However, when excessive amounts of KEVLAR fiber are added, such as in Examples 10 and 14, unacceptable preform processability problems are encountered due to non-uniformity. Thus, less than about 4.5 wt % fiber should be added to the formulation. In general, it is recommended that a range of from about 0.5 to 10 wt % of pulp be utilized with a maximum of about 4 wt % fiber to achieve an acceptable trade-off between strength and processability.

The test data also indicate that the coefficient of friction decreases somewhat with increasing pulp content. This effect is generally depicted in Table III and the FIGURE at curve 2. Thus, KEVLAR pulp additions may also be used to influence the coefficient of friction of the ultimate product. In any event, the wear and coefficient of friction properties shown in Table III are considered to be of commercial attractiveness and, hence, further demonstrate the advantageous nature of the invention.

It is pointed out that all friction material composition ingredients, other than aramid polymer pulp fiber and around polymer fiber, are specified as weight percent. The pulp fiber and fiber are specified as a weight proportion of the pulp and/or fiber to the total weight of all other friction material ingredients. In other words, a composition specifying 15% by weight of pulp would contain 100 parts by weight of all other ingredients and 15 parts by weight of pulp; the term "all other ingredients", as used in the specification and claims meaning all ingredients other than aramid polymers in pulp fiber and fiber form.

TABLE I

SEMI-METALLIC FORMULATIONS

| Component | Wt. % |
|---|---|
| Phenolic Resin | 11 |
| Carbon Particles | 12 |
| Magnesium Oxide | 1 |
| Rubber Particles | 9 |
| Inorganic Particles | 23.5 |
| Inorganic Fibers | 12 |
| Steel Fibers | 41.5 |
| | 100.0 |

TABLE II

ORGANIC NON-ASBESTOS FORMULATIONS

| Component | Wt. % |
|---|---|
| Thermosetting Resin | 10.8 |
| Carbonaceous Particles | 10.1 |
| Non-Asbestos Fibers | 7.2 |
| Organic Compounds | 11.7 |
| Inorganic Compounds | 50.2 |
| | 100.0 |

What is claimed is:

1. A non-asbestos type friction material composition suitable for use as a friction element consisting essentially of a thermosetting binder, a fibrous reinforcing material, and an effective amount of an aramid polymer pulp fiber to result in good structural integrity of a preform manufactured from said friction material.

2. The composition of claim 1, wherein: said non-asbestos type friction material is a member selected from the group consisting of semi-metallic material, organic non-asbestos material, and hydrocarbon cold forming material.

3. The composition of claim 2, wherein: said aramid polymer pulp fiber is included in an effective amount of about 15% by weight based upon the total weight of all other ingredients.

4. The composition of claim 3, wherein: said aramid pulp fiber is included in an amount from about 0.5% to 10% by weight based upon the total weight of all other ingredients.

5. The composition of claim 2, wherein: said non-asbestos type friction material is semi-metallic material.

6. The composition of claim 5, wherein: said semi-metallic material contains phenolic resin, carbonaceous particles, non-asbestos fibers, ceramic powders, and metal powder.

7. The composition of claim 6, wherein: said semi-metallic material comprises
   from 4 to 13 wt % of phenolic resin,
   from 15 to 40 wt % of carbonaceous particles,
   from 0 to 25 wt % of non-asbestos fibers,
   from 2 to 10 wt % of ceramic powder, and
   from 15 to 40 wt % of metal powder.

8. The composition of claim 2, wherein: said non-asbestos type friction material is an organic non-asbestos material.

9. The composition of claim 8, wherein: said organic non-asbestos material contains a thermosetting resin, cashew nut particles, non-asbestos fibers, and more than 20 wt % of a powdered inorganic compound having a Moh's hardness rating of greater than 2 and less than 5 and capable of being subjected to temperatures of greater than about 425° C. without substantial chemical or physical alteration.

10. The composition of claim 9, wherein: said organic non-asbestos material comprises from 10 to 30 wt % thermosetting resin, from 5 to 25 wt % cashew nut particles, from 5 to 15 wt % non-asbestos fibers, and 20 to 60 wt % powdered inorganic compound.

TABLE III

FRICTION MATERIAL PROPERTIES

| Example No. | Base Material | KEVLAR Pulp (wt. %) | KEVLAR Fiber (wt. %) | Flexural Strength (lbs.) | Coef. of Friction 200° F. | Coef. of Friction 350° F. | Wear Weight Loss (g) | Wear Thickness Loss (In.) |
|---|---|---|---|---|---|---|---|---|
| 1 | Semi-Met | — | — | 16.9 | — | — | — | — |
| 2 | Semi-Met | .5 | — | 29.5 | — | — | — | — |
| 3 | Semi-Met | 1 | — | 28.3 | — | — | — | — |
| 4 | Org. N.A. | — | — | 2.4 | .39 | .47 | .335 | .0074 |
| 5 | Org. N.A. | 1 | — | 6.5 | .43 | .46 | .272 | .0038 |
| 6 | Org. N.A. | 5 | — | 13.3 | .40 | .42 | .260 | .0058 |
| 7 | Org. N.A. | 9 | — | 19.1 | .40 | .43 | .225 | .0048 |
| 8 | Org. N.A. | 10 | — | 28.3 | .39 | .45 | .237 | .0072 |
| 9 | Org. N.A. | 15 | — | 24.4 | .36 | .42 | .230 | .0060 |
| 10 | Org. N.A. | .5 | 4.5 | 38.0* | .43 | .47 | .174 | .0046 |
| 11 | Org. N.A. | 2.5 | 2.5 | 27.6 | .39 | .42 | .300 | .0048 |
| 12 | Org. N.A. | 4.5 | .5 | 23.8 | .39 | .44 | .212 | .0050 |
| 13 | Org. N.A. | — | 1 | 15.1 | .40 | .48 | .277 | .0074 |
| 14 | Org. N.A. | — | 5 | 34.7* | .44 | .49 | .181 | .0052 |

*Very non-uniform samples of unacceptable quality for processing from preform stage.

11. The composition of claim 8, wherein: said organic non-asbestos material contains a phenolformaldehyde resin, carbon fibers, and steel fibers.

12. The composition of claim 11, wherein: said non-asbestos material contains from 6 to 12 wt % phenolformaldehyde resin, from 10 to 40 wt % carbon fibers, from 30 to 60 wt % steel fibers, and from 10 to 20 wt % filler.

13. The composition of claim 2, wherein: said non-asbestos type friction material is a hydrocarbon cold forming material.

14. The composition of claim 13, wherein: said hydrocarbon cold forming material contains non-asbestos inorganic fibers, cellulose fibers, and a thermosetting organic binder comprising a hydroxyl terminated butadiene copolymer of the formula

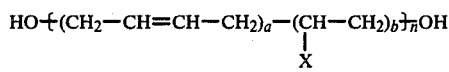

wherein X is phenyl or CN, a has a value of from 0.5 to 0.95, b has a value of from 0.05 to 0.5, and n is an integer from about 10 to 140;
said binder having been cured with from about 0.1 to about 5 wt % of a peroxide catalyst.

15. The composition of claim 14, wherein: said hydrocarbon cold forming material contains from about 20 to 70 wt % non-asbestos inorganic fibers, from 5 to 25 wt % cellulose fibers, 0 to 15 wt % coke particles, 0 to 10 wt % graphite particles, 0 to 15 wt % carbon black and 10 to 60 wt % of said thermosetting organic binder.

16. The composition of claim 13, wherein: said hydrocarbon cold forming material contains metallic materials, graphite particles, bonded together with a thermosetting hydroxyl butadiene copolymer of the formula:

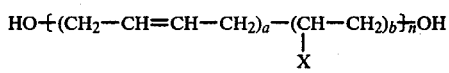

wherein X is phenyl or CN, a has a value of from 0.5 to 0.95, b has a value of from 0.05 to 0.5, and n is an integer from about 10 to about 140;
said copolymer having been cured with from about 0.02 to about 12.5 wt % of a peroxide catalyst.

17. The composition of claim 16, wherein: said hydrocarbon cold forming material contains from 15 to 75 wt % metallic material, from 5 to 50 wt % graphite particles bonded together with about 2 to 50 wt % of a thermosetting hydroxyl butadiene copolymer of the formula:

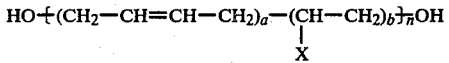

wherein X is phenyl or CN, a has a value of from 0.5 to 0.95, b has a value of from 0.05 to 0.5, and n is an integer from about 10 to 140;
said copolymer having been cured with from about 0.02 to about 12.5 wt % of a peroxide catalyst.

18. The composition of claim 1, 2, 3, or 4 wherein: said composition contains an aramid polymer fiber in an amount that is not sufficient to impair processability of the preform due to nonuniformity.

19. The composition of claim 1, 2, 3, or 4 wherein: said composition contains an aramid polymer fiber in an amount less than 4.5 by weight based on the total weight of all other ingredients.

20. The composition of claim 4, wherein: said aramid polymer fiber is present at a maximum of 4% by weight based on the total weight of all other ingredients.

21. The friction composition of claim 1 wherein said composition is in the structure of a preform.

22. The friction composition of claim 1 wherein said composition is in the structure of a friction element.

23. A method of making a preform of a non-asbestos type friction material, comprising: forming a mixtuure of a thermosetting binder, fibrous reinforcing material, and an effective amount of an aramid polymer pulp fiber to result in good structural integrity of said preform, and compressing said mixture to form a preform.

24. The method of claim 23, wherein: said non-asbestos type friction material is a member selected from the group consisting of semi-metallic material, organic non-asbestos material, and hydrocarbon cold forming material.

25. The method of claim 24, wherein: said aramid polymer pulp fiber is included in an effective amount up to 15% by wt based upon the total weight of all other ingredients.

26. The method of claim 25, wherein: said aramid polymer pulp fiber is included in an amount from 0.5 to 10% by weight based on the total weight of all other ingredients.

27. The method of claim 25, wherein: said non-asbestos type friction material is semi-metallic material.

28. The method of claim 25, wherein: said non-asbestos type friction material is organic non-asbestos material.

29. The method of claim 25, wherein: said non-asbestos type friction material is hydrocarbon cold forming material.

30. In a method of manufacturing a friction element which includes the steps of forming a mixture of a friction material composition, compressing said mixture to form a preform, curing said preform at an elevated temperature, and forming a friction element from said cured preform, wherein the improvement comprises including an effective amount of a aramid polymer pulp fiber to result in good structural integrity of the preform.

31. The method of claim 30, wherein: said compressing step is performed at ambient temperature.

32. The method of claim 30, wherein: said non-asbestos type friction material is a member selected from the group consisting of semi-metallic material, organic non-asbestos material, and hydrocarbon cold forming material.

33. The method of claim 32, wherein: said aramid polymer pulp fiber is included in an effective amount up to 15% by weight based upon the total weight of all other ingredients.

34. The method of claim 33, wherein: said aramid polymer pulp fiber is included in an amount from 0.5 to 10% by weight based upon the total weight of all other ingredients.

35. The method of claim 34, wherein: said non-asbestos type friction material is semi-metallic material.

36. The method of claim 34, wherein: said non-asbestos type friction material is organic non-asbestos material.

37. The method of claim 34, wherein: said non-asbestos type friction material is hydrocarbon cold forming material.

38. The method of claim 23, 25, 26, 30, 33, or 34, wherein: said composition contains an aramid polymer fiber in an amount that is not sufficient to impair processability of the preform due to non-uniformity.

39. The method of claim 23, 25, 26, 30, 33, or 34, wherein: said composition contains an aramid polymer fiber in an amount less than 4.5% by weight based on the total weight of all ingredients other than aramid polymer pulp fibers and aramid polymer fiber.

40. The method of claim 26 or 34, wherein: said aramid polymer fiber is present at a maximum of 4% by weight based on the total weight of all ingredients other than aramid polymer pulp fiber and aramid polymer fiber.

* * * * *

Dedication 4,374,211.—*John P. Gallagher*, Bayville, N.J.; *Philip H. Dougherty*, Penndel, Pa. ARAMID CONTAINING FRICTION MATERIALS. Patent dated Feb. 15, 1983. Dedication filed Jan. 29, 1990, by the assignee, Friction Division Products, Inc.

Hereby dedicates to the Public the remaining term of said patent.
[*Official Gazette May 1, 1990* ]